US007698272B2

(12) United States Patent
Betten et al.

(10) Patent No.: US 7,698,272 B2
(45) Date of Patent: Apr. 13, 2010

(54) APPARATUS, SYSTEM, AND METHOD FOR DETERMINISTIC FILE ALLOCATIONS FOR PARALLEL OPERATIONS

(75) Inventors: David R. Betten, Gaithersburg, MD (US); John M. Garth, Gilroy, CA (US); Christian Michel, Sindelfingen (DE); Bryan F. Smith, Austin, TX (US); Timm Zimmermann, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/848,137

(22) Filed: Aug. 30, 2007

(65) Prior Publication Data
US 2009/0063591 A1 Mar. 5, 2009

(51) Int. Cl.
G06F 7/00 (2006.01)
G06F 17/30 (2006.01)
(52) U.S. Cl. .................. 707/7; 707/2; 707/10; 717/119
(58) Field of Classification Search ........................ 707/7
See application file for complete search history.

(56) References Cited

U.S. PATENT DOCUMENTS

| | | | | |
|---|---|---|---|---|
| 5,857,180 A * | 1/1999 | Hallmark et al. | ................ | 707/2 |
| 5,890,169 A | 3/1999 | Wong et al. | ................ | 707/206 |
| 6,223,281 B1 * | 4/2001 | Bird et al. | ................... | 712/241 |
| 6,438,562 B1 * | 8/2002 | Gupta et al. | ................ | 707/201 |
| 6,820,262 B1 * | 11/2004 | Tellez et al. | ................ | 718/106 |
| 6,928,451 B2 * | 8/2005 | Mogi et al. | ................ | 707/102 |
| 6,954,776 B1 * | 10/2005 | Cruanes et al. | ............ | 709/201 |
| 6,957,211 B1 * | 10/2005 | Tyulenev et al. | ............... | 707/2 |
| 2001/0011268 A1 * | 8/2001 | Tsuchida et al. | ................ | 707/2 |
| 2003/0225967 A1 | 12/2003 | Kohli | ......................... | 711/112 |
| 2004/0015672 A1 | 1/2004 | Masse | ....................... | 711/173 |
| 2005/0102484 A1 | 5/2005 | Liu et al. | ..................... | 711/202 |
| 2005/0166011 A1 | 7/2005 | Burnett et al. | .............. | 711/112 |
| 2005/0234841 A1 | 10/2005 | Miao et al. | ..................... | 707/1 |
| 2005/0262325 A1 | 11/2005 | Shmueli et al. | ............. | 711/170 |
| 2005/0267878 A1 * | 12/2005 | Mogi et al. | .................... | 707/3 |
| 2007/0022148 A1 | 1/2007 | Akers et al. | ................. | 707/205 |
| 2007/0043793 A1 | 2/2007 | Ebata et al. | ................. | 707/205 |

OTHER PUBLICATIONS

Kumar et al. "A Load-Balanced Parallel Sorting Algorithm for Shared-Nothing Architectures", Distributed and Parallel Databases, vol. 3, No. 1, pp. 37-68, 1995.*

(Continued)

Primary Examiner—Hosain T Alam
Assistant Examiner—Shew-Fen Lin
(74) Attorney, Agent, or Firm—Kunzler Needham Massey & Thorpe

(57) ABSTRACT

An apparatus, system, and method for determining the maximum supported degree of parallel sort operations in a multiprocessor computing environment. An allocation module allocates a minimum number of sort files to a sort operation for each data source that participates in the parallel sort. The allocation module attempts to allocate sort files of one-half the sort operation data source file size, and iteratively reduces the sort file size requests in response to determinations that sort files of the requested size are not available. After allocation, a parallel operation module determines whether there is sufficient virtual storage to execute the sort operations in parallel. If there is not, the parallel operations module collapses the two smallest sort operations, thereby reducing the degree of parallelism by one, and repeats the request. The parallel operation module repeats the process until the sorts are executed or the process fails for lack of virtual storage.

6 Claims, 3 Drawing Sheets

OTHER PUBLICATIONS

Jim Wyllie, SPsort: How to sort a terabyte quickly, Technical Report, IBM Almaden Lab., Feb. 1999, http://sortbenchmark.org/SPsort.pdf.*

Simha et al.; "File Allocation for a Parallel Web-Server", 1996.
Tsai et al.; "SIFA: A Scalable File System With Intelligent File Allocation", 2002.

* cited by examiner

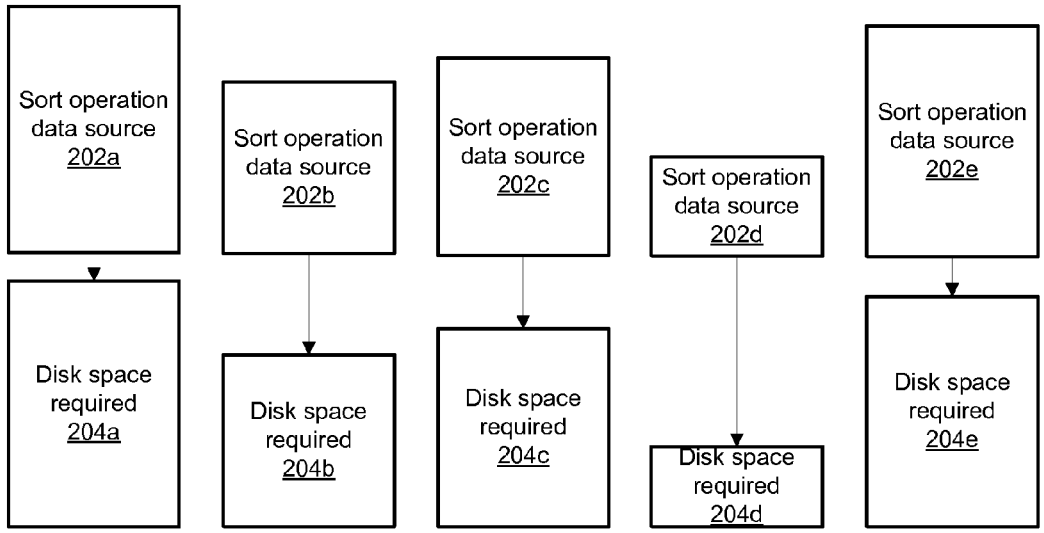
Figure 2a
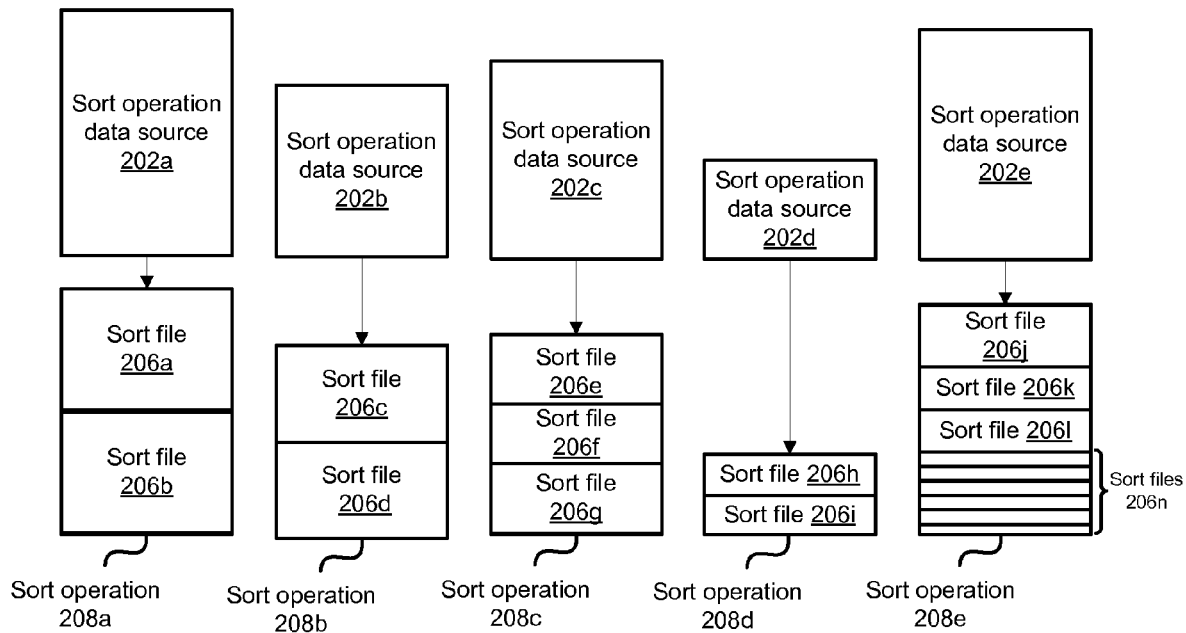
Figure 2b
Figure 2

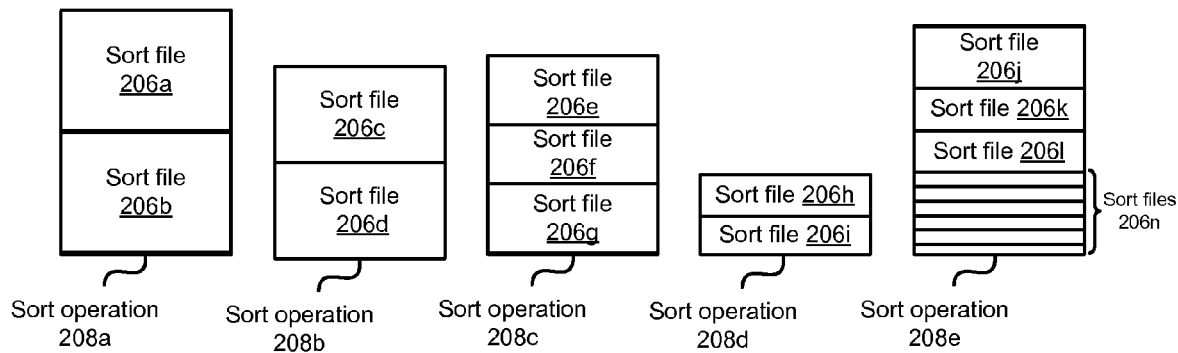
Figure 3a
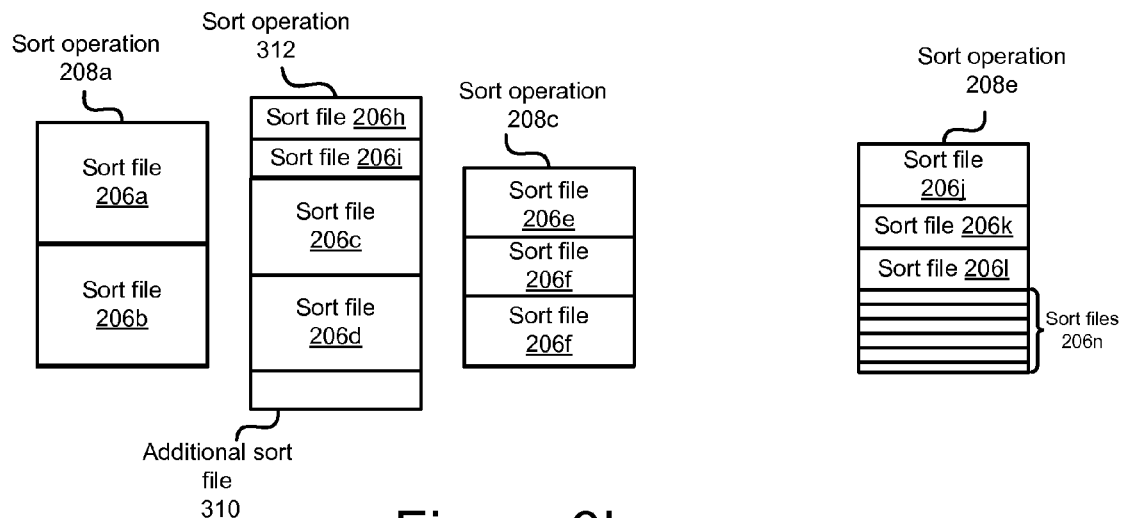
Figure 3b
Figure 3

APPARATUS, SYSTEM, AND METHOD FOR DETERMINISTIC FILE ALLOCATIONS FOR PARALLEL OPERATIONS

BACKGROUND OF THE INVENTION

1. Field of the Invention

This invention relates to optimizing parallel computing operations. More specifically, the invention relates to autonomously allocating virtual storage and determining a maximum supported degree of parallelism for a computer software system such as a database management system (DBMS).

2. Description of the Related Art

Parallel computing continues to grow in importance and popularity in the computing industry, becoming more and more common in a variety of settings. These parallel computing systems, whether executed with multiple processors or with multicore processors, are capable of simultaneously executing sets of programming instructions. As a result, a parallel computing system can offer significant performance advantages over a single processor or single core computer.

Sorting and indexing operations performed by a database management system (DBMS) are particularly suited to realize gains in a parallel computing system. However, many processing operations, particularly sorting and indexing operations, require pre-allocated disk space to predictably succeed. In addition, parallel operations require virtual storage (also commonly referred to as virtual memory) in order to support concurrent processes.

Those of skill in the art will recognize that sorting data requires disk space in the form of sort files. Opening and accessing a sort file during a sorting operation uses virtual storage. The more files that are opened, the more virtual storage is consumed. In addition, the execution of parallel operations also imposes costs in terms of virtual storage. However, in most present systems, a user such as a database administrator is left to guess at how best to allocate the sort disk space in a given system. For example, when the operation makes use of a sort component such as DFSORT in the IBM DB2 for z/OS environment, the user specifies the number of sort files to be allocated to each sort within a particular job. However, if the user enters a value that is too large, more virtual storage is allocated than the task requires, and the ability to execute the operations in parallel may be negatively impacted. If the value is too small, the job ends and the user simply has to try a different value. To add to the complications, virtual storage 114 is a volatile quantity, and availability can vary widely from one moment to the next depending on what operations are being executed.

SUMMARY OF THE INVENTION

Applicants submit that there exists a need for an apparatus, system, and method for autonomously determining optimal file allocation supporting parallel operations in a parallel computing environment. Ideally, the solution determines an optimal file allocation and ensures that the operations are executed with a maximum supported degree of parallelism without the need for input from a user. The solution should also ensure an optimal result regardless of the status of the environment at runtime.

The present invention has been developed in response to the present state of the art, and in particular, in response to the problems and needs in the art that have not yet been fully solved. Accordingly, the present invention has been developed to provide an apparatus, system, and method for allocating sort files in support of parallel sorting operations in a computer system such as a database management system (DBMS), the operations of the computer program product comprising computing the file size of a plurality of sort operation data sources that are candidates for a parallel sorting operation, allocating sort files for each sort operation data source prior to determining a maximum supported degree of parallelism for the parallel sorting operation, determining the maximum supported degree of parallelism for sorting the sort files, and executing the parallel sorting operation using the maximum supported degree of parallelism.

Allocating sort files for each sort operation data source further comprises determining for each sort operation data source a minimum number of sort files for storing the sort operation data for the sort operation. The sort operation requires at least one sort file. Some sort implementations require more than one sort file. In response to a determination of the availability of contiguous sufficient disk space to accommodate the allocation request size, the operations comprise allocating for the sort operation related to the given sort operation data source one sort file in the amount of the allocation request size. If the determination indicates the unavailability of contiguous sufficient disk space to accommodate the allocation request size, the operations comprise setting a new allocation request size equal to a fractional portion of the allocation request size. The operations also comprise allocating for the sort operation related to the given sort operation data source the minimum number of sort files necessary to store the given sort operation data source's data.

In one embodiment, the fractional portion of the allocation request size is eighty percent of the size of the allocation request size.

Collapsing the smallest sort operation with a next-smallest sort operation further comprises allocating additional sort files to a smallest sort operation such that the smallest sort operation's record length is equal in size to the next-smallest sort operation's record length. The collapsing operations further comprise changing the names of the sort files for the smallest sort operation and the names of the sort files for the next-smallest sort operation to a common file name convention.

The present invention also encompasses a database management system for allocating virtual storage in support of parallel indexing operations in a database management system (DBMS), the system comprising at least two processors configured to operate in parallel and virtual storage.

The system further comprises an allocation module configured to allocate sort files for a sort operation for each sort operation data source prior to determining a maximum supported degree of parallelism for the parallel sorting operation, where the allocation of sort files further comprises determining for each sort operation data source a minimum number of sort files for storing the sort operation data source data. In certain embodiments, there are at least two sort files for each sorting operation.

The system further comprises a parallel operation module configured to determine the maximum supported degree of parallelism for sorting the sort files, and to execute the parallel sorting operation using the maximum supported degree of parallelism.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 2a-2b are schematic block diagrams illustrating one embodiment of allocating sort files; and FIG. 3 is a schematic class diagram illustrating one embodiment of determining and setting a maximum supported degree of parallelism.

DETAILED DESCRIPTION OF THE INVENTION

Figure 1:
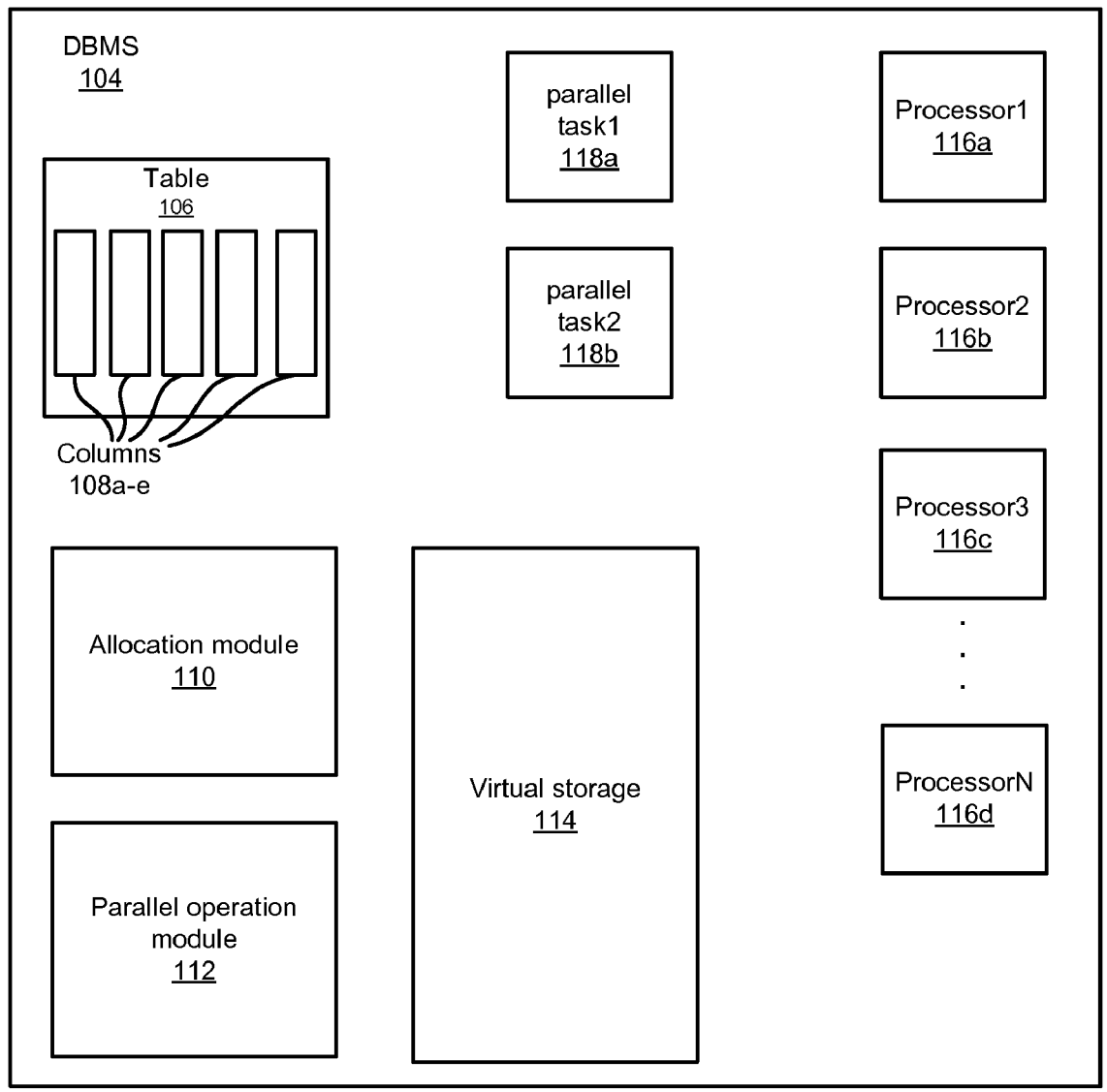
FIG. 1 is a schematic block diagram illustrating one embodiment of a system for allocating sort files in support of parallel sort operations in a database management system (DBMS)

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as a processor and memory device, field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware processors and memory, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for allocating disk space in support of parallel sorting operations in a computing environment, such as a database management system (DBMS). The system 100 is illustrative in that it comprises a database management system (DBMS) 104. Those of skill in the art will recognize that a DBMS 104 is a set of software programs that work in conjunction to manage, organize, store, and retrieve data in one or more related databases. Examples of DBMS 104 include IBM's DB2 for z/OS, Oracle, and Microsoft SQL Server.

The DBMS 104 comprises one or more tables 106. A table comprises a set of data values organized in rows and in columns 108a-e. The data values the DBMS 104 actively manages and works with are stored in tables 106. The columns 108a-e are generally identified by a name and identify that all data values within the column 108a-e reference a common idea. For example, a column 108a may be identified as "last name", column 108b as "first name", column c as "gender", column d as "state", and column e as "emplID". The column 108d may be made up of values such as 'NY', 'DE', etc.

The DBMS 104 further comprises virtual storage 114. As mentioned above, virtual storage is also commonly referred to as virtual memory. Those of skill in the art will recognize that virtual memory is an addressing and storage scheme that allows a computing system to overflow the available RAM by using the hard disk as an additional storage space. Programs can use virtual memory addresses to store data, and when the program is executed, have the virtual addresses converted into real memory addresses. Virtual storage 114, however, is a limited resource for the system 100, and various programs and operations may be in competition for access to virtual storage 114. If there is insufficient virtual storage 114 to meet all demands from the programs and operations, those programs which are unable to get the requested virtual storage 114 may fail.

A DBMS 104 may further comprise one or more parallel tasks 118a-b. Parallel tasks 118a-b are separate sets or threads of instructions and data to be simultaneously processed by processors 116a-d. Those of skill in the art will appreciate that any number of operations may be designated as parallel tasks 118a-b. For example, sorting and indexing operations lend themselves naturally to being handled in a parallel fashion in a DBMS 104 comprising more than one processor 116a-d. While two parallel tasks 118a-b are shown, the number of parallel tasks 118a-b is not restricted to any particular number.

The DMBS 104 further comprises processors 116a-d. Each individual processor 116a-d is capable of processing instructions and data in a serial fashion; however, each processor 116a-d may operate simultaneously on different threads of instruction. As a result, if a DBMS 104 comprised at a particular moment four threads, each thread taking one second to execute completely, the DBMS 104 would require one second to execute all four threads. In contrast, if the DBMS 104 had only a single processor, such as processor 116a, the four tasks would have to processed serially, taking four seconds.

The DBMS 104 further comprises an allocation module 110. The allocation module 110 determines the disk space requirements for a number of operations that are ideally performed in parallel. In addition, the allocation module 110 allocates sort files 206a-n (discussed in greater detail below) for each sort operation 208a-e. For each sort operation 208a-e, the allocation module 110 allocates the minimum number of sort files needed to perform the sort operation 208a-e with a single pass of the input data. In one embodiment, such as where the DFSORT component is utilized, the allocation module 110 ideally allocates two sort files for each sort operation 208a-e.

For example, in FIG. 1, the tasks to be performed in parallel may be two sorts on the data in table 106, where each sort is done on a different column 108a-e. This may be done as part of an indexing operation. Such a task would naturally lend itself as a candidate for a parallel operation, with the sort on the first column (such as column 108a) represented by parallel task 118a and the sort on a second column (such as column 108c) represented by parallel task 118b. As known to those of skill in the art, sorting requires an allocation of disk space in support of the sort operation 208a-e in the form of sort files 206a-n. Opening and accessing a sort file 206a-n during a sort operation 208a-e uses virtual storage. The more sort files 206a-n that are opened, the more virtual storage 114 is consumed. The allocation module 110 ideally allocates the minimum number of sort files 206a-n necessary for each sort operation 208a-e. By so doing, the allocation module 110 maximizes the total amount of virtual storage 114 available to support other operations.

Once the allocation module 110 has allocated the sort files 206a-n, the parallel operation module 112 determines the maximum supported degree of parallelism for the parallel operation in question. To continue our example, we have two sort tasks represented as parallel tasks 118a-b, and thus the maximum supported degree of parallelism in this case is two. Another possible restriction on the maximum supported degree of parallelism is the number of processors or cores in the system 100. A system 100 will only be physically and logically equipped to handle a finite number of parallel operations.

The parallel operation module 112 requests from the DBMS 104 information concerning the amount of virtual storage 114 remaining after the allocation module 114 allocates the sort files 206a-n. The parallel operation module 112 further determines how much virtual memory 114 is needed in order to execute the parallel tasks 118a-b in parallel. Those of skill in the art are aware of methods for acquiring information concerning the availability of virtual storage 114 and determining the amount of virtual storage 114 necessary to support n-parallel operations.

If the amount of virtual storage 114 needed to support the execution of the given degree of parallelism (starting at the maximum possible) is available, the parallel operation module 112 simply executes the parallel tasks 118a-b in parallel with the maximum degree of parallelism. However, if there is insufficient virtual storage 114 to support the execution of the parallel tasks 118a-b in parallel, the parallel operation module 112 collapses the two sort smallest sort operations 208 into a single sort operation 208. Thus, if there were initially four parallel tasks 118, but insufficient virtual storage 114 to execute them in parallel, the parallel operation module 112 collapses the two smallest parallel tasks 118. As a result, three parallel tasks 118 remain. The parallel operation module 112 then repeats the processing of determining whether there is sufficient virtual storage 114 to support the execution of the three parallel tasks 118 in parallel. If so, the parallel tasks 118 are executed. If not, the parallel operation module 112 again collapses the smallest two parallel tasks (resulting in two) and repeats the determination. This process continues until either the tasks are executed or until the parallel operation module 112 determines that there is insufficient virtual storage 114 to support even a single operation, at which point the parallel operation module 112 provides an error or alert to a user such as a database administrator.

FIGS. 2a-2b are schematic block diagrams illustrating one embodiment of allocating sort files in accordance with the present invention. FIGS. 2a-2b provide a graphical illustration and more in-depth explanation of the operations of the allocation module 110. FIG. 2a illustrates five sort operation data sources 202a-e. Sort operation data sources 202a-e represent possible sources of data to be sorted in parallel. For example, with reference to FIG. 1, multiple sorts may be performed on the table 106 in accordance with the five different columns 108a-e. As mentioned above, the five different sorts are natural candidates for parallel execution. Each column represents a separate sort operation data source 202a-e.

As discussed above, a sort operation 208a-e requires an allocation of disk space in the form of sort files 206a-n prior to execution of the sort. FIG. 2b depicts the collection of sort files 206a-n allocated to enable the sort operations 208a-e for each sort operation data source 202a-e.

The allocation module 110 computes the disk space required 204a-e for each sort operation data source 202a-e that is part of the parallel sort. With the disk space required 204a-e determined, the allocation module 110 can begin the process of allocating the sort files 206a-n for each sort operation 208a-e. Those of skill in the art will recognize that many sort components typical in DBMS 104 (such as, for example, IBM's DFSORT) require at least two sort files 206a-n to perform a sorting operation 208a-e. In such an embodiment, the allocation module 110 first attempts to allocate a sort file 206a equal to one-half of the disk space required 204a. If there is contiguous sufficient disk space available, the sort operations 208a-e will each have two sort files 206. This is the case shown in FIG. 2b, showing sort operations 208a and 208b comprising sort files 206a-b and 206c-d respectively. Alternatively, a sort operation 208 may comprise a single sort file 206.

However, such an optimal allocation is not always possible. The disk space may, for example, be heavily fragmented, thus preventing an optimal allocation. As a result, a request by the allocation module 110 may fail when there is insufficient contiguous disk space to fulfill a particular request for a given size of sort file 206a-n.

Where a request for a particular size of a sort file 206a-n fails, the allocation module 110 resizes the request. In one embodiment, the allocation module 110 resizes and requests sort files 206a-n such that the minimum number of sort files 206a-n necessary for storing the sort operation data source 202a-e data are used. The allocation module 110 requests a largest possible size of sort file 206a-n; in one embodiment, this entails starting with a request for a sort file 206a-n with a size equal to half the size of the particular sort operation data source 202a-e. Thus, in FIG. 2b, the allocation module 110 requests an allocation of one-half of the size of the disk space required 204a. This allocation is fulfilled, as represented by sort file 206a. The process repeats for sort file 206b, at which point sort files 206a-b are completely allocated by for the particular sort operation 208a. The process repeats for sort operation data source 202b, with the result being the allocations of sort files 206c-d for sort operation 208b.

However, with sort operation data source 202c, when the allocation module 110 requests an allocation of disk space equal to one-half the size of the disk space required 204c, the allocation module 110 receives a response indicating that a sort file 206 of that size is not available. In response, the allocation module 110 sets a new allocation request size which is equal to a fractional portion of the previous allocation request size. For example, the allocation module 110 may reduce the allocation request size (filesize/2) by twenty-percent and request a sort file 206a-n equal to this new amount. If the disk space is available, then the allocation module 110 allocates the sort file 206a-n and it becomes part of the sort operation 208. Since it is unlikely that there are sort files 206a-n of a greater size available, the allocation module 110 may only ask for sort files 206a-n of a size equal to or less than that of the last request.

For example, in FIG. 2b, the initial request for a virtual storage block 206a-n of a size equal to one-half of file candidate 202c fails. As a result, the allocation module 110 reduces the request size by twenty percent and re-submits the request. If this again fails, the allocation module 110 reduces the last request size by twenty percent and requests a virtual storage block 206a-n of that size. This process repeats until either the allocation module 110 determines it can obtain a particular size of virtual storage block 206a-n or until it determines that there is insufficient virtual storage 114 to support the allocation process.

In FIG. 2b, the allocation module 110 determines that a sort file 206e, equal to roughly one-third of the size of the disk space required 204c, is available. For purposes of illustration, we can say that the size is equal to 200 MB. As a result, the allocation module 110 allocates a sort file 206e of that size to the sort operation 208c. The allocation module 110 repeatedly requests sort files 206a-n of this size until the sort files 206a-n necessary for the sort operation 208c are entirely allocated.

For sort operation data source 202e, the sort files 206j-n may be of a size equal to sort files 206h-i. However, as shown with the multiple sort files 206n, the disk space may be heavily fragmented. As a result, only small sort files 206n are available towards the end of the allocation process in this particular embodiment. However, when the allocation process is complete, sort files 206a-n are allocated to the sort operations 208a-e such that a minimum number of sort files 206a-n are allocated for the sort operations 208a-e.

With the allocation process complete, the allocation module 110 passes control to the parallel operations module 112. As described above, the parallel operations module 112 determines the maximum supported degree of parallelism for executing the sort operations 208a-e. The parallel operations module 112 first determines whether there is sufficient virtual storage 114 remaining after the allocation process described above to support a given degree of parallelism. The given degree of parallelism starts as the value of the largest logical possible parallel operation. For example, in FIGS. 3a-b, there are five sort operations 208a-e. Since there are five sort operations 208a-e, the given degree of parallelism would not start at a value greater than five. As discussed above, an additional limitation may be the number of parallel operations the system 100 can physically support. For example, if the DBMS 104 has three processors (or, alternatively, two physically separate processors and one dualcore processor) the given degree of parallelism may be limited to three.

The parallel operations module 112 determines the amount of virtual storage 114 needed to perform the given degree of operations in parallel, as described above. In the situation illustrated in FIG. 3a, for example, the parallel operations module 112 would determine the amount of virtual storage 114 needed to perform a fifth degree of operations in parallel. The parallel operations module 112 then determines the amount of virtual storage 114 available. Functions or tools providing information concerning the amount of virtual storage 114 available and calculating the amount of virtual storage 114 needed to perform a given degree of operations in parallel are made available as part of most DBMS 104.

If there is sufficient virtual storage 114 remaining after the allocation process described above to support the given degree of operations in parallel, the parallel operations module 112 directs the execution of the parallel sorting operations using the given degree of parallelism. Thus, the operations are performed with a maximum supported degree of parallelism.

If, however, the amount of virtual storage 114 needed to execute the sort operations with the given degree of parallelism is greater than the maximum available virtual storage 114, the parallel operations module 112 reduces the quantity of operations to be performed in parallel by combining, or collapsing, the two smallest sort operations 208a-e into a single sort operation 208. The result is that the given degree of parallelism is reduced by one, and the parallel operations module 112 can then re-determine the amount of virtual storage 114 needed to execute the new given degree of parallelism and compare it with a new determination of the amount of virtual storage 114 available.

As a result, the parallel operations module 112 determines whether a particular degree of parallelism can be supported, starting with the maximum logical possibility. If the DBMS 104 has sufficient virtual memory 114 to support the operation, the parallel operations module 112 directs the execution of the sorting operations with the maximum degree of parallelism. If not, The parallel operations module 112 reduces the degree by one by collapsing two previously separate tasks (sort operation 208b and sort operation 208d) into a single task (sort operation 312). The parallel operations module 112 iteratively continues this task of determining and reducing until either all sort operations 208a-e are collapsed into a sort operation 208 and the task is performed serially, or the parallel operations module 112 determines that there is insufficient virtual memory 114 even to execute the tasks serially, at which point the parallel operations module 112 indicates to the user that the operation simply cannot be performed as specified.

For example, the parallel operations module 112 may have a scenario as illustrated in FIG. 3A. The parallel operations module 112 may determine that there is insufficient virtual memory 114 available to perform the five sort operations 208a-e (comprising sort files 206a-n) with degree five parallelism. The parallel operations module 112 then determines which two sort operations 208a-e are the smallest. As illustrated, sort operations 208b and 208d are the smallest.

As shown in FIG. 3B, the parallel operations module 112 collapses the two sort operations 204b and 204d into a sort operation 312 comprising sort files 206h, 206i, 206c, and 206d. Those of skill in the art will recognize that where the data in the sort files 204b and 204d comprises index keys, the index keys are prefixed by an index number or index name. Because the prefix indicates which index a key belongs to, the sort operations 208b and 208d can be run as a single sort operation 312 without resulting in an improper sorting result.

In support of this collapsing operation, the parallel operations module 112 may have to allocate additional sort files 310 to the smallest sort operation 208d such that the smallest sort operation 208d's record length is equal in size to the next-smallest sort operation 208b's record length. For example, as discussed above, one of the sort operations (for example, 208b) may deal with gender information with a sex code of m/f, each code occupying one byte. The sort operation 208d may deal with state codes (CA, NY, etc), each code occupying two bytes. The parallel operations module 112 pads the smaller of the two indexes such that they are both the same length. As a result, in order to hold this additional padding, the parallel operations module 112 allocates additional sort block 310.

The parallel operations module 112 further changes the names of the sort files comprising the smallest sort operation 208b and the next-smallest sort operation 208d to a common file name convention. Those of skill in the art will recognize that sort components such as DFSORT take the first four characters of a file name in order to determine which sort files 206a-n belong to which sort operation 208a-e. For example, sort operation 208b may have originally comprised sort files 206c-d named SWO2WK01 and SWO2WK02 respectively. Sort operation 208d may have comprised sort files 206h-i named SWO4WK01, and SWO4WK02 respectively. Parallel operations module 112 collapses the two sort operations 208b and 208d to a single sort operation 312 comprising the sort files 206c-d, sort files 206h-i, and additional sort file 310. The sort files referenced above are then changed to share a common file name convention, specifying SWO2WK01, SWO2WK02, SWO2WK03, SWO2WK04, and SWO2WK05.

With the collapsing operation complete, the parallel operations module 112 may then repeat the determination of whether there is sufficient virtual storage 114 to support the new degree of parallelism; as illustrated in FIG. 3b, there are now four sort operations 208a, 312, 208b, and 208e. If the parallel operation module 114 determines that the four sort operations 208a, 312, 208b, and 208e may be performed in parallel, the parallel operations module 114 executes the tasks in parallel. If there is insufficient virtual memory 114, the parallel operations module 112 repeats the process of collapsing, renaming, and then re-testing to determine if the three remaining tasks may be performed in parallel. The process repeats until the tasks are executed with the maximum possible supported degree of parallelism, or until the parallel operations module 112 determines that there is insufficient virtual memory 114 to support execution of the tasks in any parallel fashion, including degree one parallelism (serial execution).

In one embodiment, with these determinations in place, the sort operations 208a-e are executed with the sort component receiving the number of sort files to be allocated for each sort operation and the amount of disk space required for each sort operation. In accordance with the present invention, these determinations are made autonomously, saving a user from making guesses as to the optimal allocation to support a maximum possible degree of parallelism. In one embodiment, the number of sort files 206a-n to be allocated for each sort operation 208a-e cannot exceed two-hundred and fifty-five.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program for allocating disk space in support of parallel sorting operations in a database management system (DBMS), the operations of the computer program product comprising:
   computing a file size of a plurality of sort operation data sources participating in a parallel sorting operation;
   allocating sort files for each sort operation data source participating in the parallel sorting operation prior to determining a maximum supported degree of parallelism for the parallel sorting operation, the allocation of sort files further comprising:
      determining for each sort operation data source a minimum number of sort files necessary for storing the sort operation data source data for each sort operation, each sort operation comprising at least two sort files;
   determining the maximum supported degree of parallelism for executing the parallel sort operation, determining the maximum degree of parallelism further comprising:
      in response to an amount of virtual storage needed to execute the parallel sort operation for a given degree of parallelism being less than or equal to a maximum available virtual storage, setting the maximum degree of parallelism as the given degree of parallelism;
      while the amount of virtual storage needed to execute the parallel sort operation for the given degree of parallelism is greater than the maximum available virtual storage, collapsing a smallest sort operation with a next-smallest sort operation, reducing the given degree of parallelism by one, and setting the reduced degree of parallelism as the maximum degree of parallelism,
         wherein collapsing a smallest sort operation with a next-smallest sort operation comprises allocating additional sort files to the smallest sort operation such that the smallest sort operation's record length is equal in size to the next-smallest sort operation's record length; and
   executing the parallel sorting operation using the maximum supported degree of parallelism.

2. The computer program product of claim 1, wherein determining for each sort operation data source a minimum number of sort files necessary for storing the sort operation data source data for each sort operation further comprises:
   setting an allocation request size for a given sort operation data source to half the size of the given sort operation data source;
   in response to a determination of the availability of sufficient disk space to accommodate the allocation request size, allocating to the each sort operation for the given sort operation data source one sort file in the amount of the allocation request size;
   in response to a determination of the unavailability of sufficient disk space to accommodate the allocation request size, setting a new allocation request size equal to a fractional portion of the allocation request size;
   allocating to the each sort operation for the given sort operation data source the minimum number of sort files necessary to store the given sort operation data source data.

3. The computer program product of claim 2, wherein the fractional portion of the allocation request size is eighty percent of the size of the allocation request size.

4. The computer program product of claim 2, further comprising providing a number of sort files to be allocated for each sort operation and an amount of disk space required for each sort operation to a sort component, the number of sort files to be allocated for each sort operation not exceeding two-hundred and fifty-five.

5. The computer program product of claim 1, wherein collapsing a smallest sort operation with a next-smallest sort operation further comprises changing the names of each sort file of the smallest sort operation and the names of each sort file of the next-smallest sort operation to a common file name convention.

6. A database management system for allocating disk space in support of parallel indexing operations in a database management system (DBMS), the system comprising:

at least two processors configured to operate in parallel;

virtual storage;

a sort component configured to perform a sort operation comprising two or more sort files;

an allocation module configured to:

compute a file size of a plurality of sort operation data sources participating in a parallel indexing operation;

allocate sort files for each sort operation data source prior to determining a maximum supported degree of parallelism for the indexing operation, the allocation of sort files further comprising determining for each sort operation data source a minimum number of sort files necessary for storing the sort operation data source data for each sort operation, each sort operation comprising at least two sort files;

a parallel operation module configured to:

determine the maximum supported degree of parallelism for executing the parallel sort operation and to execute the parallel indexing operation using the maximum supported degree of parallelism, wherein determining the maximum degree of parallelism further comprises:

in response to an amount of virtual storage needed to execute the parallel sort operation for a given degree of parallelism being less than or equal to a maximum available virtual storage, setting the maximum degree of parallelism as the given degree of parallelism;

while the amount of virtual storage needed to execute the parallel sort operation for the given degree of parallelism is greater than the maximum available virtual storage, collapsing a smallest sort operation with a next-smallest sort operation, reducing the given degree of parallelism by one, and setting the reduced degree of parallelism as the maximum degree of parallelism, wherein collapsing a smallest sort operation with a next-smallest sort operation comprises allocating additional sort files to the smallest sort operation such that the smallest sort operation's record length is equal in size to the next-smallest sort operation's record length; and execute the parallel sorting operation using the maximum supported degree of parallelism.

* * * * *